(12) United States Patent
Donneau-Golencer et al.

(10) Patent No.: US 10,367,649 B2
(45) Date of Patent: Jul. 30, 2019

(54) SMART SCHEDULING AND REPORTING FOR TEAMS

(71) Applicant: Tempo AI, Inc., Menlo Park, CA (US)

(72) Inventors: Thierry Donneau-Golencer, Menlo Park, CA (US); Rajan Singh, Menlo Park, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 142 days.

(21) Appl. No.: 14/079,496

(22) Filed: Nov. 13, 2013

(65) Prior Publication Data

US 2015/0135095 A1    May 14, 2015

(51) Int. Cl.
*G06F 3/048* (2013.01)
*H04L 12/18* (2006.01)

(52) U.S. Cl.
CPC .............................. *H04L 12/1818* (2013.01)

(58) Field of Classification Search
None
See application file for complete search history.

(56) References Cited

U.S. PATENT DOCUMENTS

| | | | |
|---|---|---|---|
| 2,454,039 A | 11/1948 | Cox |
| 2,484,865 A | 10/1949 | Strickland, Jr. |
| 2,493,785 A | 1/1950 | Strickland, Jr. |
| 2,598,694 A | 6/1952 | Kerbenar |
| 2,657,301 A | 10/1953 | Kincaid |
| 2,971,160 A | 3/1954 | Segsworth |
| 2,714,647 A | 8/1955 | Good |
| 2,819,370 A | 1/1958 | Osborn, Jr. |
| 3,051,812 A | 8/1962 | Gschwender |
| 3,143,628 A | 8/1964 | Golden |
| 3,502,310 A | 3/1970 | Coffman |
| 3,601,571 A | 8/1971 | Curcio |
| 3,775,831 A | 12/1973 | Cachat |
| 4,021,274 A | 5/1977 | Chadwick |
| 4,673,785 A | 6/1987 | Damiani |
| 4,831,552 A | 5/1989 | Scully |
| 5,438,660 A | 8/1995 | Lee |
| 5,577,188 A | 11/1996 | Zhu |
| 5,608,872 A | 3/1997 | Schwartz et al. |
| 5,649,104 A | 7/1997 | Carleton et al. |
| 5,664,109 A | 9/1997 | Johnson |
| 5,715,450 A | 2/1998 | Ambrose et al. |
| 5,761,419 A | 6/1998 | Schwartz et al. |
| 5,774,867 A | 6/1998 | Fitzpatrick |
| 5,819,038 A | 10/1998 | Carleton et al. |
| 5,821,937 A | 10/1998 | Tonelli et al. |

(Continued)

FOREIGN PATENT DOCUMENTS

GB          502152          3/1939

OTHER PUBLICATIONS

"Google Plus Users", Google+Ripples; Oct. 31, 2011; 3 pages.

(Continued)

*Primary Examiner* — William C Trapanese
(74) *Attorney, Agent, or Firm* — Schwabe Williamson & Wyatt

(57) ABSTRACT

The present disclosure extends to methods, systems, and computer program products for providing collaboration among users within a group and to provide improved scheduling and reports based on group characteristics.

18 Claims, 6 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Formukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,480,830 B1 | 11/2002 | Ford |
| 6,513,063 B1 | 1/2003 | Julia |
| 6,523,061 B1 | 2/2003 | Halverson |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,079 B1 | 8/2003 | Ruvolo |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,738,767 B1 | 5/2004 | Bhatt |
| 6,742,021 B1 | 5/2004 | Halverson |
| 6,754,681 B2 | 6/2004 | Brodersen et al. |
| 6,757,718 B1 | 6/2004 | Halverson |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,036,128 B1 | 4/2006 | Julia |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,113,797 B2 | 9/2006 | Kelley |
| 7,139,722 B2 | 11/2006 | Perella |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,340,484 B2 | 3/2008 | S |
| 7,343,365 B2 | 3/2008 | Farnham |
| 7,356,482 B2 | 4/2008 | Frankland et al. |
| 7,370,282 B2 | 5/2008 | Cary |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,433,876 B2 | 10/2008 | Spivak |
| 7,454,509 B2 | 11/2008 | Boulter et al. |
| 7,475,021 B2 | 1/2009 | Wilbrink |
| 7,508,789 B2 | 3/2009 | Chan |
| 7,509,388 B2 | 3/2009 | Allen |
| 7,587,501 B2 | 9/2009 | Stillion |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,704,496 B2 | 4/2010 | Goddard |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,809,599 B2 | 10/2010 | Andrew |
| 7,827,208 B2 | 11/2010 | Bosworth et al. |
| 7,840,543 B2 | 11/2010 | Guiheneuf |
| 7,853,881 B1 | 12/2010 | Aly Assal et al. |
| 7,904,321 B2 | 3/2011 | Moore |
| 7,945,653 B2 | 5/2011 | Zukerberg et al. |
| 7,958,003 B2 | 6/2011 | De Vries |
| 7,979,319 B2 | 7/2011 | Toulotte |
| 7,992,085 B2 | 8/2011 | Wang-Aryattanwanich |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,032,508 B2 | 10/2011 | Martinez |
| 8,060,567 B2 | 11/2011 | Carroll |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,244,821 B2 | 8/2012 | Carroll |
| 8,275,836 B2 | 9/2012 | Beaven et al. |
| 8,280,984 B2 | 10/2012 | Lance |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,548,951 B2 | 10/2013 | Solmer |
| 8,566,301 B2 | 10/2013 | Rueben et al. |
| 8,612,876 B2 | 12/2013 | Barnett |
| 8,646,103 B2 | 2/2014 | Jakobson et al. |
| 8,682,736 B2 | 3/2014 | Flake |
| 8,799,826 B2 | 8/2014 | Missig |
| 8,805,833 B2 | 8/2014 | Nath |
| 8,849,806 B2 | 9/2014 | Walker |
| 8,918,431 B2 | 12/2014 | Mark |
| 8,983,500 B2 | 3/2015 | Yach |
| 9,245,010 B1 | 1/2016 | Donneau-Golencer |
| 9,298,818 B1 | 3/2016 | Donneau-Golencer |
| 9,330,381 B2 | 5/2016 | Anzures |

(56) References Cited

U.S. PATENT DOCUMENTS

| | | |
|---|---|---|
| 9,443,007 B2 | 9/2016 | Donneau-Golencer |
| 9,471,666 B2 | 10/2016 | Singh |
| 9,704,138 B2 | 7/2017 | Siegel |
| 9,720,574 B2 | 8/2017 | Siu |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0101169 A1 | 5/2003 | Bhatt |
| 2003/0120675 A1 | 6/2003 | Stauber et al. |
| 2003/0135565 A1 | 7/2003 | Estrada |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0138944 A1* | 7/2004 | Whitacre ............... G06Q 10/10 705/7.42 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0027805 A1 | 2/2005 | Aoki |
| 2005/0050555 A1 | 3/2005 | Exley et al. |
| 2005/0091098 A1 | 4/2005 | Brodersen et al. |
| 2005/0114777 A1 | 5/2005 | Szeto |
| 2005/0197954 A1 | 9/2005 | Maitland |
| 2006/0085436 A1 | 4/2006 | Dettinger |
| 2006/0089945 A1 | 4/2006 | Paval |
| 2006/0095556 A1* | 5/2006 | Arnold ............... H04M 1/72522 709/223 |
| 2006/0190833 A1 | 8/2006 | Sangiovanni |
| 2006/0212330 A1 | 9/2006 | Savilampi |
| 2006/0245641 A1 | 11/2006 | Viola |
| 2007/0198648 A1 | 8/2007 | Allen |
| 2007/0219875 A1 | 9/2007 | Toulotte |
| 2007/0244976 A1 | 10/2007 | Carroll |
| 2008/0094205 A1 | 4/2008 | Thorn |
| 2008/0140498 A1* | 6/2008 | Setty et al. ........................ 705/9 |
| 2008/0148181 A1 | 6/2008 | Reyes |
| 2008/0195705 A1 | 8/2008 | Lee |
| 2008/0249972 A1 | 10/2008 | Dillon |
| 2009/0063415 A1 | 3/2009 | Chatfield et al. |
| 2009/0070322 A1 | 3/2009 | Salvetti |
| 2009/0100342 A1 | 4/2009 | Jakobson |
| 2009/0106224 A1 | 4/2009 | Roulland |
| 2009/0125817 A1 | 5/2009 | O'Sullivan |
| 2009/0177744 A1 | 7/2009 | Marlow et al. |
| 2009/0259670 A1 | 10/2009 | Inmon |
| 2009/0307162 A1 | 12/2009 | Bui |
| 2010/0004971 A1 | 1/2010 | Lee |
| 2010/0030715 A1 | 2/2010 | Eustice |
| 2010/0069035 A1 | 3/2010 | Johnson |
| 2010/0122190 A1 | 5/2010 | Lu |
| 2010/0153160 A1* | 6/2010 | Bezemer ............... G06Q 10/06 705/7.12 |
| 2010/0162105 A1 | 6/2010 | Beebe |
| 2010/0179961 A1 | 7/2010 | Berry |
| 2010/0180200 A1 | 7/2010 | Donneau-Golencer |
| 2011/0099189 A1 | 4/2011 | Barraclough |
| 2011/0131202 A1 | 6/2011 | Cohen et al. |
| 2011/0218958 A1 | 9/2011 | Warshaysky |
| 2011/0239158 A1 | 9/2011 | Barraclough |
| 2011/0247051 A1 | 10/2011 | Bulumulla et al. |
| 2011/0295612 A1 | 12/2011 | Donneau-Golencer |
| 2011/0295852 A1 | 12/2011 | Wang et al. |
| 2012/0016678 A1 | 1/2012 | Gruber |
| 2012/0030194 A1 | 2/2012 | Jain |
| 2012/0042218 A1 | 2/2012 | Cinarkaya |
| 2012/0066393 A1 | 3/2012 | Tekwani |
| 2012/0124153 A1 | 5/2012 | Carroll |
| 2012/0131020 A1 | 5/2012 | Nitz |
| 2012/0150979 A1 | 6/2012 | Monaco |
| 2012/0158472 A1 | 6/2012 | Singh |
| 2012/0173464 A1 | 7/2012 | Tur |
| 2012/0191501 A1* | 7/2012 | Olliphant ......... G06Q 10/06314 705/7.19 |
| 2012/0233137 A1 | 9/2012 | Jakobson et al. |
| 2012/0233531 A1 | 9/2012 | Ma |
| 2012/0234824 A1 | 9/2012 | Nakatsu |
| 2012/0290407 A1 | 11/2012 | Hubbard et al. |
| 2012/0290950 A1 | 11/2012 | Rapaport |
| 2012/0297312 A1 | 11/2012 | Lance |
| 2012/0297321 A1 | 11/2012 | Douglas |
| 2013/0024924 A1 | 1/2013 | Brady |
| 2013/0036117 A1* | 2/2013 | Fisher ............... G06F 17/30029 707/736 |
| 2013/0036369 A1 | 2/2013 | Mitchell |
| 2013/0066921 A1 | 3/2013 | Mark et al. |
| 2013/0110842 A1 | 5/2013 | Donneau-Golencer |
| 2013/0185336 A1 | 7/2013 | Singh |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0332525 A1* | 12/2013 | Liu ....................... G06Q 10/109 709/204 |
| 2014/0035949 A1 | 2/2014 | Singh |
| 2014/0046876 A1 | 2/2014 | Zhang |
| 2014/0136612 A1 | 5/2014 | Redfern |
| 2014/0143685 A1* | 5/2014 | Rekhi ................... G06Q 10/109 715/753 |
| 2014/0164510 A1* | 6/2014 | Abuelsaad ........... G06Q 10/109 709/204 |
| 2014/0225897 A1* | 8/2014 | Sarrazin ............... G06Q 10/109 345/467 |
| 2014/0359537 A1 | 12/2014 | Jakobson et al. |
| 2015/0135094 A1 | 5/2015 | Donneau-Golencer |
| 2016/0350342 A1 | 12/2016 | Donneau-Golencer |
| 2016/0378854 A1 | 12/2016 | Singh |

OTHER PUBLICATIONS

Heidorn, "Natural Language Dialogue for Managing an On-Line Calendar", Proceedings of the 1978 Annual Conference, ACM, 1978, pp. 45-52.

Modi, et al., "CMRadar: A Personal Assistant Agent for Calendar Management", Department of Computer Science, Carnegie Mellon University, Springer-Verlag Berlin Heidelberg, 2005, pp. 169-181.

Schwabe Williamson & Wyatt, PC Listing of Related Cases; Nov. 3, 2016, 2 pages.

\* cited by examiner

US 10,367,649 B2

SMART SCHEDULING AND REPORTING FOR TEAMS

RELATED U.S. APPLICATION

This application is related to U.S. application Ser. No. 14/079,454, filed Nov. 11, 2013. The application is incorporated herein by reference for all purposes.

BACKGROUND

In the modern world most projects require collaboration between members of a group, and most projects are time driven with deadlines and events. Yet current collaboration tools fail in integrating time in a convenient manner while executing projects to completion. The calendar is essential in time management and is the entry point to one's day and an essential tool for team cooperation on projects. Despite the calendar's central role, and its inherent actionability as a collaborative tool, the calendar remains largely a read-only, non-actionable and non-collaborative experience. In addition, current calendar applications fail to improve user experience even though event data is inherent to the calendar application. Another short fall of current calendaring applications is that scheduling an event or meeting remains automated and tedious. Additionally, current calendaring program products fail to utilize their inherent reporting ability relative to event happenings and event participant characteristics. What is needed is an intuitive calendaring application that utilizes its inherent advantages to provide an improved user experience.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

The present disclosure extends to methods, systems, and computer program products for facilitating collaboration between group members via a calendaring application by enhancing scheduling and reporting processes relative to events within a project.

As the disclosure proceeds, reference may be made to learning and optimizing technologies that are largely the subject matter of previously filed patent applications, all of which are hereby incorporated by this reference in their entireties, namely:

U.S. patent application Ser. No. 12/632,491 filed on Dec. 7, 2009 entitled ELECTRONIC ASSISTANT, Patent Application Publication No. 2010-0180200;

U.S. patent application Ser. No. 13/287,983 filed on Nov. 2, 2011 titled TOOLS AND TECHNIQUES FOR EXTRACTING KNOWLEDGE FROM UNSTRUCTURED DATA RETRIEVED FROM PERSONAL DATA SOURCES; and U.S. patent application Ser. No. 13/149,536 filed on May 31, 2011 titled METHOD AND APPARATUS FOR USER MODELIZATION.

It should be noted, that in the event that embodiments within the above-referenced patent applications contradict the present disclosure, it is intended that the present disclosure dominates and supersedes such embodiments.

As used herein the terms "group" and "groups" are intended to mean a plurality of people engaged on a common project. A group may be based on other attributes such as location, industry, job title, behavior etc. A group may comprise members that may be part of multiple groups and there may be interactions across groups. There may be many sizes of groups from large to small, but all of the groups contain a plurality of members. Groups may be represented as explicit teams and implicit teams.

As used herein "explicit team" is intended to convey one type of group that may be grouped by company domain or predefined family or other user definition.

As used herein "implicit team" may be a group based on invited or suggested participants.

As used herein "shared group area" is intended to convey a group collaboration mechanism or presenting information related to projects to team members. It should be noted that a shared group area may be digital or physical.

As used herein "collaboration group" is intended to denote a plurality of individuals and entities (sub-groups) working on a common project.

As used herein "event" is intended to convey a calendarable item or happening having a plurality of participants, users or members.

The calendar may be the entry point for the day and is generally an essential tool for team/group collaboration on projects. Despite this central role, calendars are reduced at present to a scheduling platform merely letting users create events or view them in a very basic form. Events that may be scheduled within a calendaring application can typically come and go with little advantage made of the data is contained with, or may be acquired by the calendaring application.

Figure 1:
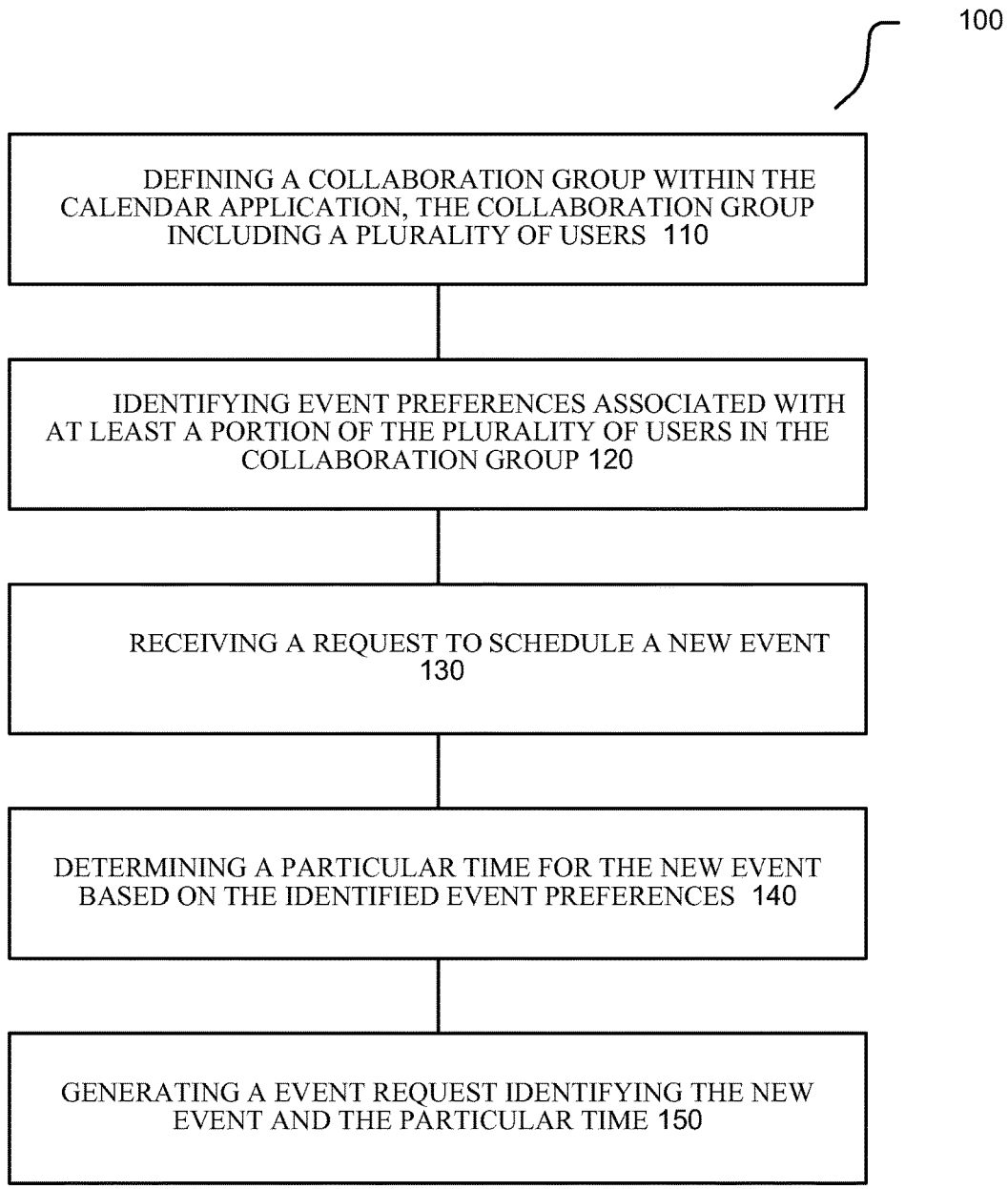
FIG. 1 illustrates an implementation of a method for collaborating through a calendar application in accordance with the technologies and features of the disclosure.

Referring now to the figures, FIG. 1 illustrates an implementation of a method for smart scheduling through a calendar application. The method 100 may comprise a process performed in a computing environment 200 (of FIG. 2) by a computing device 300 (of FIG. 3), wherein the method 100 may assist in scheduling an event by: at 110, defining, using one or more processors 302, a collaboration group 222 within the calendar application 230. The collaboration group 222 may include a plurality of users user 1, user 2 ... user n at 110 of method. The collaboration group 222 may be an implicit group or may be an explicit group as defined above. It should be noted that the user group may comprise members that are across, and participate in, many user groups.

At 120, identifying, using one or more processors 302 and memory 304 event preferences associated with at least a portion of the plurality of users in the collaboration group 222. As used herein an event may be an event represented within the calendaring application by characteristics for furthering a project.

At 130, receiving over a computer network 208 a request to schedule a new event. The new event may be associated with prior events or a plurality of users user 1, user 2 . . . user n in the collaboration group 222.

At 140, determining a particular time for the new event based on the identified event preferences that were identified at 120. In an implementation, the preferences may be a mix of user and group characteristics automatically gathered by the application such as, choices from previous events, contextual information regarding the project or projects, type of events, information about the participants such as their role, and may even comprise data from different event locations and availability of group members taken from different calendars that may impact a desired time for the new event.

Finally, at 150, generating an event request identifying the new event and the particular time of the new event. The method may further comprise presenting the information to the collaboration group 222. The process of presenting the new event to the collaboration group 222 may be over a computer network 208. Additionally, the new event may be presented within a shared group area 240, and may be generated on the fly as part of a current event, thereby automatically taking into account the current event preferences and needs in scheduling the new event.

In an implementation, the shared group area 240 may indicate the temporal availability of project resources such as users/group members, physical locations such as conference rooms, information objects, and the like.

In an implementation, the shared group area 240 may allow each user to share his free/busy time in a permanent or temporary basis with some specific individuals or with all. It should be understood that sharing free/busy time can be done in a number of different ways. For example, availability may be shared at a global level, selecting which calendars to share and who to share it with. The calendaring application may allow users to share with non-application users via a permalink, and/or sharing with the public via a public permalink.

An implementation may comprise the feature of sharing on a temporary or predetermined basis (e.g., share for a week) and access may be revoked for some or all at any time. The implementation may comprise a user interface having a "share my free time" button, which may let the user select which calendars to share and for which days/times/ duration. In such an implementation, the application may automatically generate either a permalink that the user can share via Email, SMS, or in-app or a pre-formatted Email, SMS, in-app message.

Additionally, an implementation may facilitate content shared dynamically based on implicitly determined work schedule and/or relationship level with different users, groups and projects. It should be noted that when scheduling an event with one or more attendees who have shared their free/busy information, the calendaring application may allow the user choose to use that information as part of the scheduling flow.

In an implementation, free/busy information may be displayed as an overlay on a calendar view (e.g., day view or week view) to quickly show free spots or come as a warning when the user tries to schedule at a time when one of the attendees is busy. The system can also automatically suggest a time or a set of times when all event attendees are available. In addition to free/busy information, suggested times may also be based on event preferences and other learned preferences from the user and the invited attendees as is disclosed in the U.S. patent application titled "Electronic Assistant" noted above and is incorporated herein by reference. The implementation may also let the user/team quickly schedule follow-ups based on all participant's availability, event type, previous patterns and more.

Implementations of the present disclosure may comprise or utilize a special purpose or general-purpose computer, including computer hardware, such as, for example, one or more processors and system memory, as discussed in greater detail below Implementations within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the disclosure can also be used in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS)), and deployment models (e.g., private cloud, community cloud, public cloud, hybrid cloud, or any suitable service type model now known to those of ordinary skill in the field, or later discovered). Databases and servers described with respect to the present disclosure can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Figure 2:
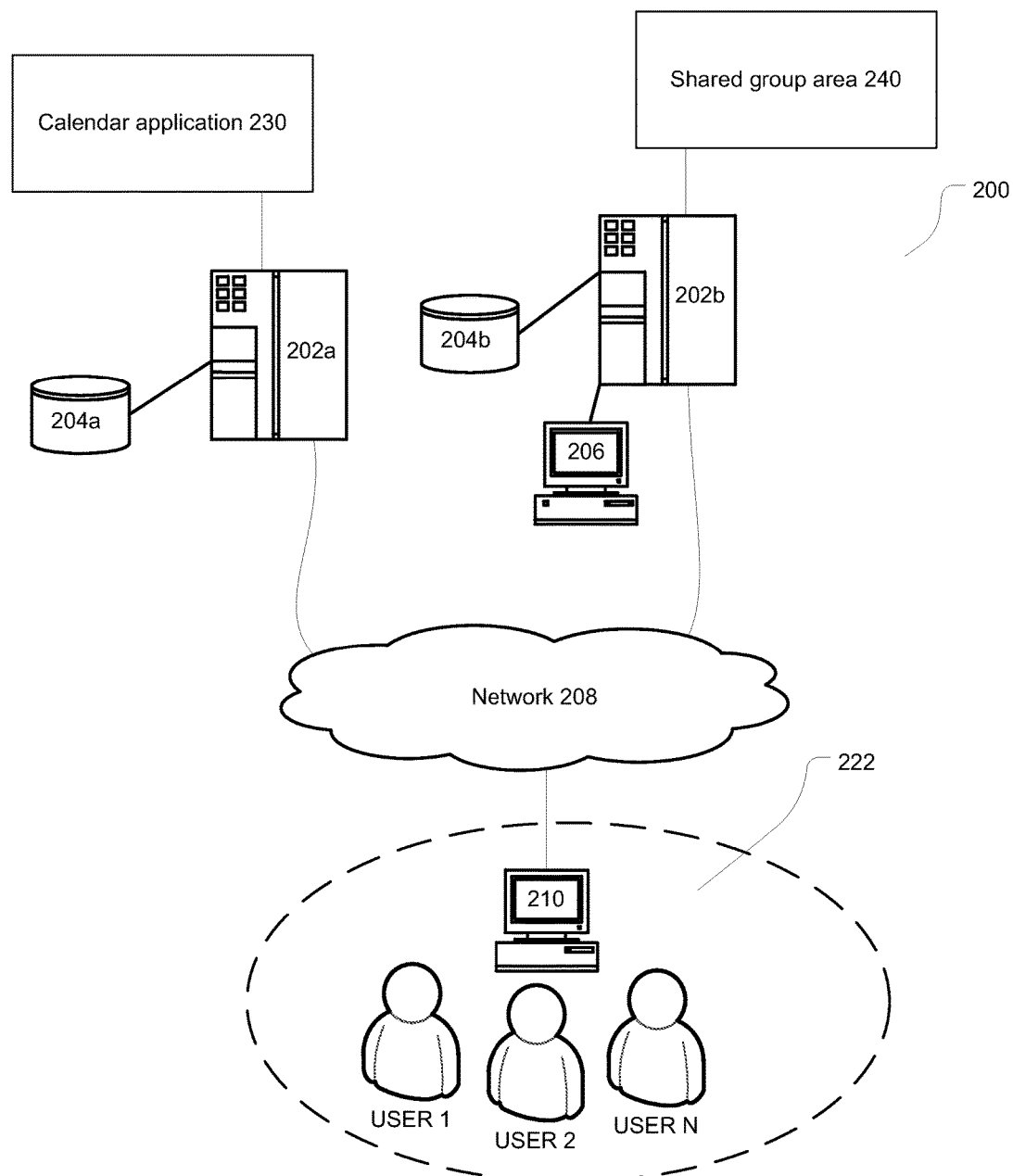
FIG. 2 illustrates an example of a computing environment suitable for implementing the methods disclosed herein and in accordance with the technologies and features of the disclosure.

FIG. 2 illustrates an example of a computing environment 200 suitable for implementing the methods disclosed herein. In some implementations, a server 202a provides access to a database 204a in data communication therewith may facilitate a calendar application 230. The database 204a may store information and may record information such as calendar data. The database 204a may additionally store project information contained in a plurality of records for collaboration. The server 202a may provide access to the database 204a to users and groups 222 associated with a project. For example, the server 202a may implement a web server for receiving requests for data stored in the database 204a and formatting requested information into web pages that may be provided to users during an event. The web server may additionally be operable to receive information and store the information in the database 204a and facilitate the shared group area 240.

A server 202b may be associated with the shared group area 240 providing event type data such as preferences as discussed herein. The server 202b may be in data communication with a database 204b. The database 204b may store information regarding various events and groups 222. In particular, information for scheduling and reporting may include a name, availability, preferences, description, categorization, event, and group 222 and document data, comments, sales, past event data, and the like. The server 202b may analyze this data as well as data retrieved from the database 204a in order to perform methods as described herein. An operator may access the server 202b by means of a workstation 206 that may be embodied as any general purpose computer, tablet computer, smart phone, or the like.

The server 202a and server 202b may communicate over a network 208 such as the Internet or some other local area network (LAN), wide area network (WAN), virtual private network (VPN), or other network. A user may access data and functionality provided by the servers 202a, 202b by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a, 202b and databases 204a, 204b may have some or all of the attributes of a computing device and may operate the calendaring application 230. It should be noted that the calendar application 230 may be operated from any computing device with in the computing environment 200.

Figure 3:
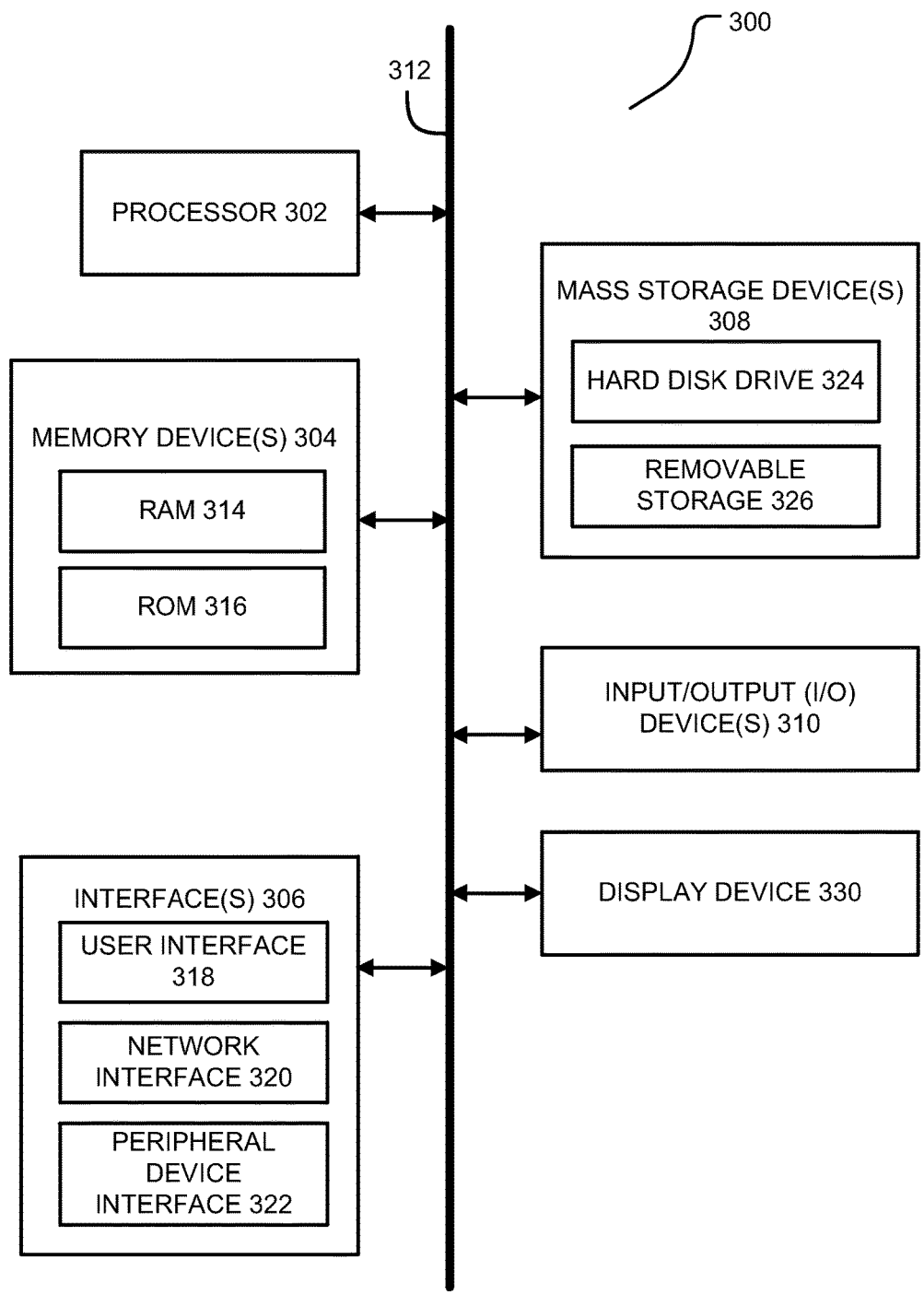
FIG. 3 illustrates a block diagram illustrating an example computing device in accordance with the technologies and features of the disclosure.

FIG. 3 illustrates a block diagram illustrating an example computing device 300. Computing device 300 may be used to perform various procedures, such as those discussed herein. Computing device 300 can function as a server, a client, or any other computing entity. Computing device 300 can perform various monitoring functions as discussed herein, and can execute one or more application programs, such as the application programs described herein. Computing device 300 can be any of a wide variety of computing devices, such as a desktop computer, a notebook computer, a server computer, a handheld computer, tablet computer and the like.

Computing device 300 includes one or more processor(s) 302, one or more memory device(s) 304, one or more interface(s) 306, one or more mass storage device(s) 308, one or more Input/Output (I/O) device(s) 310, and a display device 330 all of which are coupled to a bus 312. Processor(s) 302 include one or more processors or controllers that execute instructions stored in memory device(s) 304 and/or mass storage device(s) 308. Processor(s) 302 may also include various types of computer-readable media, such as cache memory.

Memory device(s) 304 include various computer-readable media, such as volatile memory (e.g., random access memory (RAM) 314) and/or nonvolatile memory (e.g., read-only memory (ROM) 316). Memory device(s) 304 may also include rewritable ROM, such as Flash memory.

Mass storage device(s) 308 include various computer readable media, such as magnetic tapes, magnetic disks, optical disks, solid-state memory (e.g., Flash memory), and so forth. As shown in FIG. 3, a particular mass storage device is a hard disk drive 324. Various drives may also be included in mass storage device(s) 308 to enable reading from and/or writing to the various computer readable media. Mass storage device(s) 308 include removable media 326 and/or non-removable media.

I/O device(s) 310 include various devices that allow data and/or other information to be input to or retrieved from computing device 300. Example I/O device(s) 310 include cursor control devices, keyboards, keypads, microphones, monitors or other display devices, speakers, printers, network interface cards, modems, lenses, CCDs or other image capture devices, and the like.

Display device 330 includes any type of device capable of displaying information to one or more users of computing device 300. Examples of display device 330 include a monitor, display terminal, video projection device, and the like.

Interface(s) 306 include various interfaces that allow computing device 300 to interact with other systems, devices, or computing environments. Example interface(s) 306 may include any number of different network interfaces 320, such as interfaces to local area networks (LANs), wide area networks (WANs), wireless networks, and the Internet. Other interface(s) include user interface 318 and peripheral device interface 322. The interface(s) 306 may also include one or more user interface elements 318. The interface(s) 306 may also include one or more peripheral interfaces such as interfaces for printers, pointing devices (mice, track pad, or any suitable user interface now known to those of ordinary skill in the field, or later discovered), keyboards, and the like.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 300, and are executed by processor(s) 302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 4:
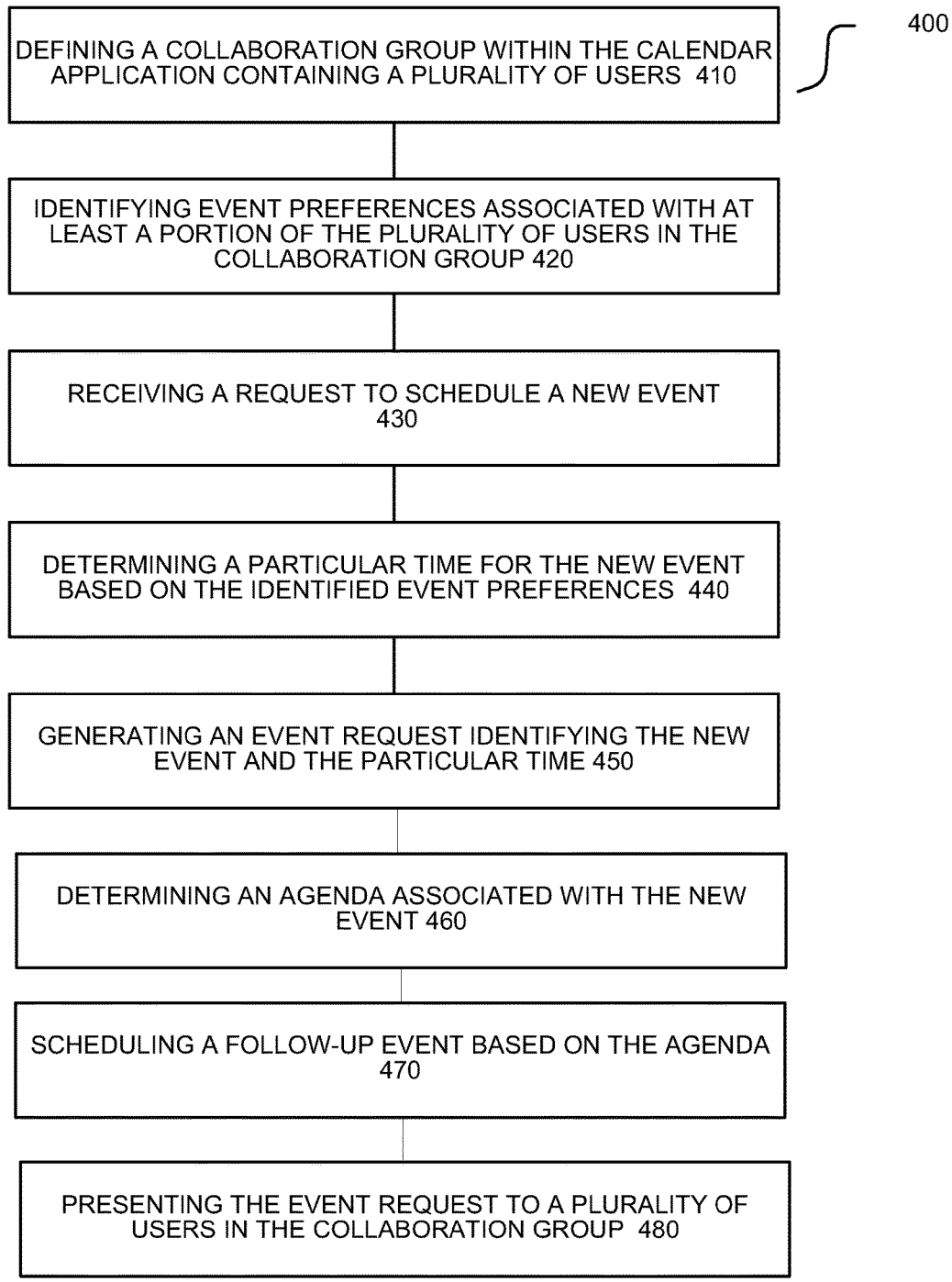
FIG. 4 illustrates an implementation of a method for collaborating through a calendar application in accordance with the technologies and features of the disclosure.

FIG. 4 illustrates an implementation of a method for smart scheduling through a calendar application having additional functionality. The method 400 may comprise a process performed in a computing environment 200 (of FIG. 2) by a computing device 300 (of FIG. 3), wherein the method 400 may assist in scheduling an event by: at 410, defining, using one or more processors 302, a collaboration group 222 within the calendar application 230. The collaboration group 222 may include a plurality of users user 1, user 2 . . . user n at 410 of method. The collaboration group 222 may be an implicit group or may be an explicit group as defined above. It should be noted that the user group may comprise members that are across, and participate in, many user groups.

At 420, identifying, using one or more processors 302 and memory 304 event preferences associated with at least a portion of the plurality of users in the collaboration group. As used herein a meeting may be an event represented within the calendaring application by characteristics for furthering a project.

At 430, receiving over a computer network 208 a request to schedule a new event. The new event may be associated with prior events or a plurality of users user 1, user 2 . . . user n in the collaboration group 222.

At 440, determining a particular time for the new event based on the identified event preferences that were identified at 420. In an implementation, the preferences may be a mix of user and group characteristics automatically gathered by the application such as, choices from previous events, contextual information regarding the project or projects, and may even comprise data from different event locations, availability of group members taken from different calendars that may impact a desired time for the new event.

At 450, generating an event request identifying the new event and the particular time of the new event. The method may further comprise presenting the information to the collaboration group 222. The process of presenting the new event to the collaboration group 222 may be over a computer network 208. Additionally, the new event may be presented within a shared group area 240, and may be generated on the fly as part of a current event, thereby automatically taking into account the current event preferences and needs in scheduling the new event.

At 460, determining an agenda associated with the new event and based on the information and preferences gathered previously. The agenda may be presented with in the shared group area to all of the event attendees.

At 470, scheduling a follow-up event based on the agenda determined at 460.

At 480, presenting the event request to a plurality of users in the collaboration group. The presenting may be done through the calendar application or may be sent out through third party applications.

An implementation may comprise determining the particular time for the new event that is further based on availability information shared by each of the plurality of users. Furthermore, an implementation may comprise determining the particular time for the new event that is further based on previous or historic availability of each of the plurality of users during a previous time period.

An implementation may comprise determining the particular time for the new event that is further based on expected geographic locations of each of the plurality of users or attendees of the new event.

Figure 5:
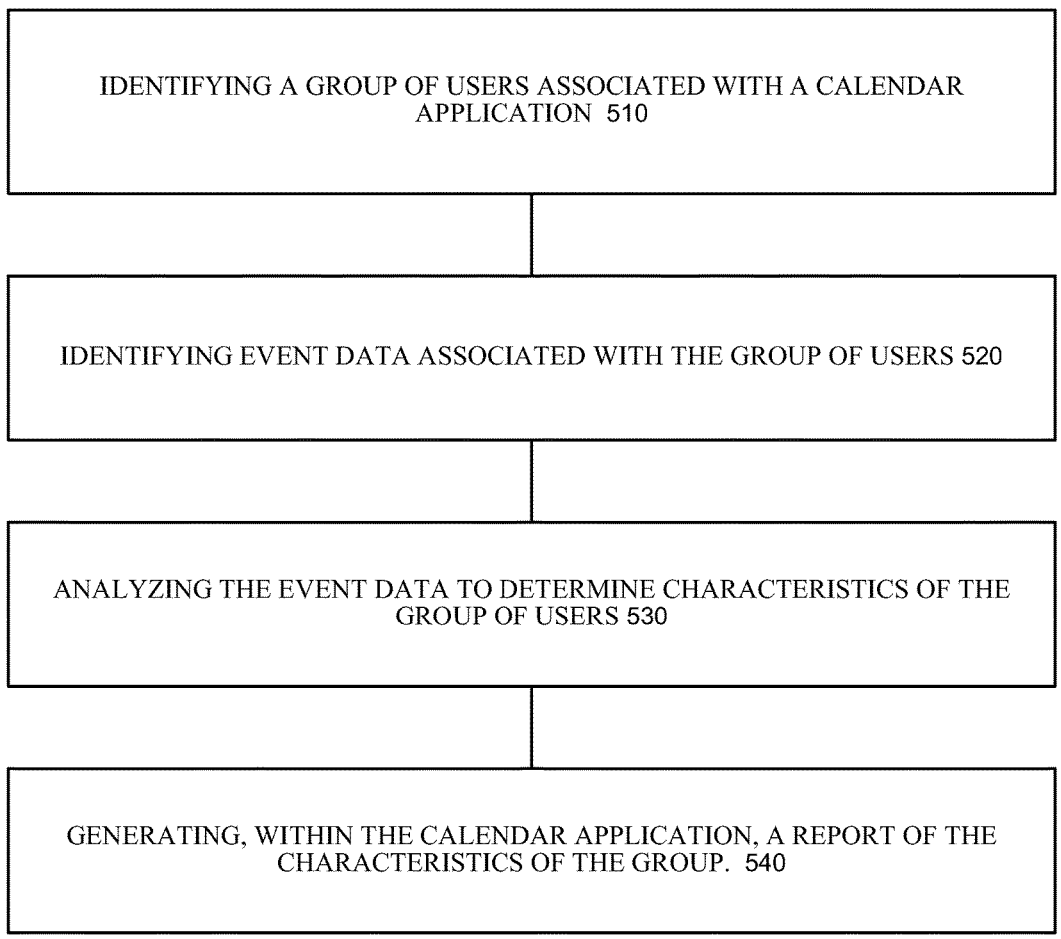
FIG. 5 illustrates an embodiment of a method for including and generating reports as facilitated by a calendaring application.

FIG. 5 illustrates a method for providing reports derived from a calendar application. The method 500 is intended to be implemented by a computing device 300 within a computing environment 200.

At 510 of method 500, identifying a group of users associated with a calendar application. In an implementation, as the method is being used, it learns about the user and other members in the group and data is collected for each individual user, and in aggregate for the group. Examples of the data being collected may include: the number and type of events, the people met and their positions/companies, location of events, Emails sent and received, documents and notes edited and shared, and any other information that may be used in generating meaningful reports.

At 520, identifying event data associated with the group of users.

At 530, the data identified and collected at 510 and 520 is analyzed to determine characteristics of the group.

At 540, generating a report of the characteristics of the group. In an implementation, a calendar application may use this data to create visualizations and helpful analytics to inform individual users and teams on how the members are performing along certain dimensions and criteria relative to a project. The data can be used at an individual level for self-measurement and improvement and in the context of a team to measure the overall performance of the group. For example, how a sales team is performing on certain opportunities or with certain clients, how many events were held and at which level of the organization, or how many new contacts were made.

In an implementation, meaningful ratios may be extracted from the data, and may be created and tracked. Examples of meaningful data include: work/life balance, average number of events per client, hours spent for expense report generation, etc.

This reporting capability may be helpful to management, providing helpful analytics in terms of team performance, direction and engagement, main focus, etc. An implementation may incorporate these ratios to provide perspective over time relative to with different groups within the organization, teams and companies of similar size in a similar industry, etc.

Figure 6:
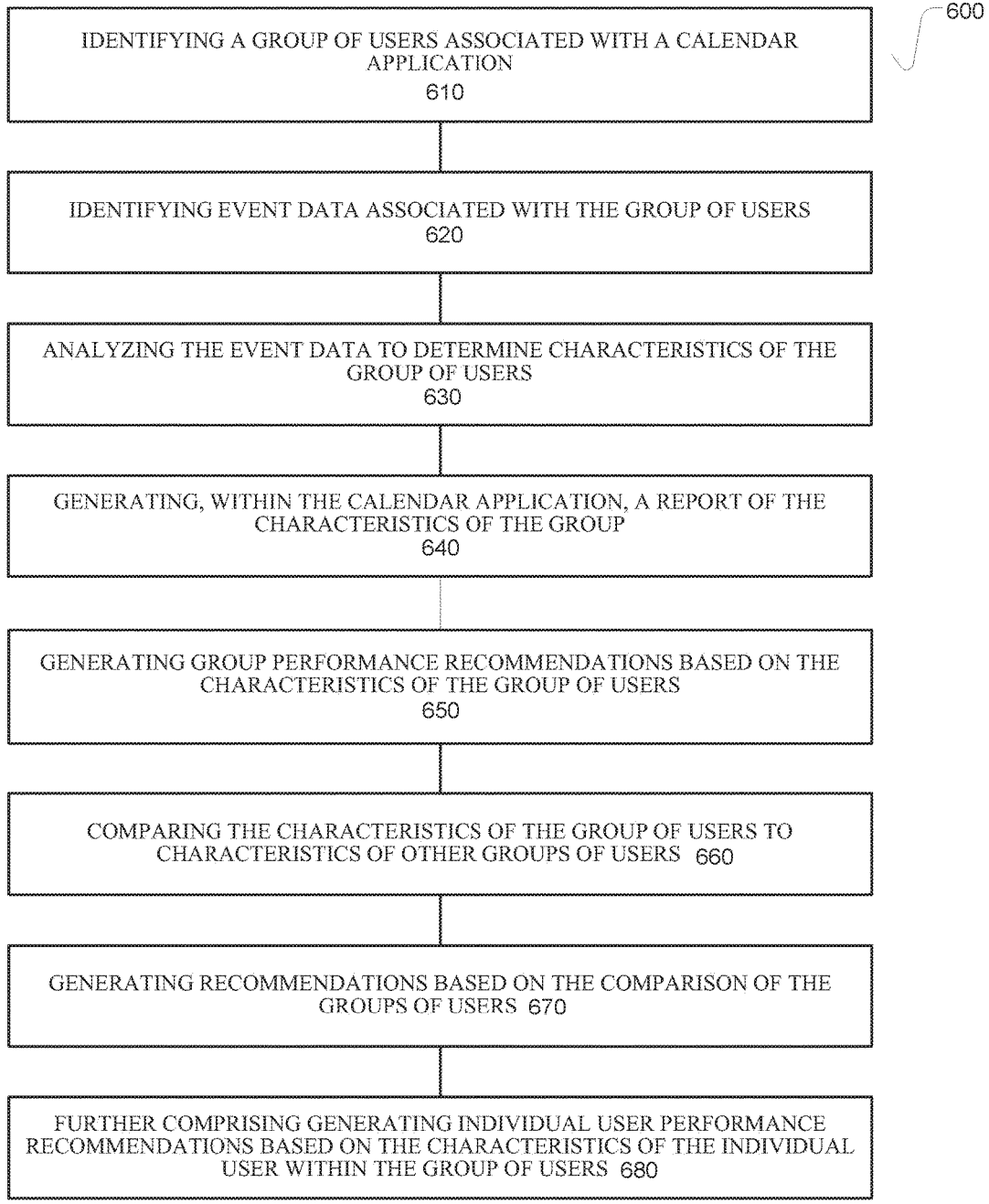
FIG. 6 illustrates a method for including and generating reports as facilitated by a calendaring application as is consistent with the technologies and features of the disclosure.

FIG. 6 illustrates a method for providing reports derived from a calendar application with additional functionality. The method 600 is intended to be implemented by a computing device 300 within a computing environment 200.

At 610 of method 600, identifying a group of users associated with a calendar application. In an implementation, as the method is being used it learns about the user and other members in the group and data is collected for each individual user, and in aggregate for the group. Examples of the data being collected may include: the number and type of events, the people met and their positions/companies, location of events, Emails sent and received, documents and notes edited and shared, and any other information that may be used in generating meaningful reports.

At 620, identifying event data associated with the group of users.

At 630, the data identified and collected at 610 and 620 is analyzed to determine characteristics of the group.

At 640, generating a report of the characteristics of the group. In an implementation, a calendar application may use this data to create visualizations and helpful analytics to inform individual users and teams on how the members are performing along certain dimensions and criteria relative to a project. The data can be used at an individual level for self-measurement and improvement and in the context of a team to measure the overall performance of the group.

At 650, generating group performance recommendations based on the characteristics of the group of users.

At 660, comparing the characteristics of the group of users to characteristics of other groups of users.

At 670, generating recommendations based on the comparison of the groups of users.

At 680, further comprising generating individual user performance recommendations based on the characteristics of the individual user within the group of users.

In addition to the implementations discussed above, an implementation may include event data such as: quantity of events, types of events, users involved in events, positions of users involved in events, companies of users involved in events, locations of events, messages communicated regarding the events, documents associated with the events, notes associated with the events, and note editing activities associated with the events.

An implementation may include event data that is associated with individual user activities, and wherein at least a portion of the event data is associated with group activities.

An implementation may comprise group performance recommendations that include at least one of performance with specific clients, a quantity of events conducted, quantities of events at different levels of an organization, and a quantity of new contacts generated.

An implementation may include data wherein the other groups of users are from within the same organization and the method further comprises generating individual user performance recommendations based on the characteristics of the individual user within the group of users.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:
1. An apparatus, comprising:
a processor; and
a memory device coupled to the processor, the memory device having instructions stored thereon for operating a calendar application, the instructions, in response to execution by the processor, performing operations comprising:
defining a collaboration group within the calendar application, the collaboration group including a plurality of users engaged on a same project;
identifying information based on interactions by the users with the calendaring application about the project, wherein the information includes metadata about the events and additional data, the metadata including quantity of events, types of events, users involved in events, positions of users involved in events, companies of users involved in events, or locations of events, the additional data including content of messages communicated regarding the events, documents associated with the events, or notes associated with the events;
determining a context based on the collected information and using a plural-ML-model (machine learning) based system;
deriving, based on the context, a visualization to inform one or more of the users on a performance of the collaboration group with respect to the project;

comparing the performance of the collaboration group with respect to the project to a performance of a different collaboration group having a different plurality of users, wherein deriving, based on the context, a visualization to inform one or more of the users on a performance of the collaboration group with respect to the project further comprises deriving the visualization based on the comparing; and presenting the visualization to at least one user of the plurality of users.

2. The apparatus of claim 1, wherein the context is based on availability information shared by each user of the plurality of users.

3. The apparatus of claim 1, wherein the context is based on previous availability of each user of the plurality of users during a time period.

4. The apparatus of claim 1, wherein the context is based on expected geographic locations of each user of the plurality of users.

5. The apparatus of claim 1, wherein the operations further comprise:

determining an agenda based on the context; and scheduling a follow-up event based on the agenda.

6. A method of operating a collaboration platform using a calendar application, the method comprising:

defining a collaboration group within the calendar application, the collaboration group including a plurality of users engaged on a same project;

identifying information based on interactions by the users with the calendaring application about the project, wherein the information includes metadata about the events and additional data, the metadata including quantity of events, types of events, users involved in events, positions of users involved in events, companies of users involved in events, or locations of events, the additional data including content of messages communicated regarding the events, documents associated with the events, or notes associated with the events;

determining a context based on the collected information and using a plural-ML-model (machine learning) based system;

deriving, based on the context, a visualization to inform one or more of the users on a performance of the collaboration group with respect to the project;

comparing the performance of the collaboration group with respect to the project to a performance of a different collaboration group having a different plurality of users, wherein deriving, based on the context, a visualization to inform one or more of the users on a performance of the collaboration group with respect to the project further comprises deriving the visualization based on the comparing; and presenting the visualization to at least one user of the plurality of users.

7. The method of claim 6, wherein the context is based on individual user activities.

8. The method of claim 6, wherein the context is based on group activities.

9. The method of claim 6, further comprising generating group performance recommendations based on the performance of the collaboration group with respect to the project.

10. The method of claim 9, wherein the group performance recommendations includes at least one of performance with specific clients, a quantity of events conducted, quantities of events at different levels of an organizations, and a quantity of new contacts generated.

11. The method of claim 6, further comprising:

generating recommendations based on the comparing.

12. The method of claim 11, wherein the different plurality of users includes users within a same organization as users of the plurality of users.

13. The method of claim 6, further comprising generating an individual user performance recommendation for one of the users based on the context.

14. An apparatus, comprising:

a processor; and a memory device coupled to the processor, the memory device having instructions stored thereon for operating a calendar application, the instructions, in response to execution by the processor, performing operations comprising:

defining a collaboration group within the calendar application, the collaboration group including a plurality of users engaged on a same project;

identifying information based on interactions by the users with the calendaring application about the project, wherein the information includes metadata about the events and additional data, the metadata including quantity of events, types of events, users involved in events, positions of users involved in events, companies of users involved in events, or locations of events, the additional data including content of messages communicated regarding the events, documents associated with the events, or notes associated with the events;

determining a context based on the collected information and using a plural-ML-based (machine learning) model based system;

deriving, based on the context, a report to inform one or more of the users on a performance of the collaboration group with respect to the project;

comparing the performance of the collaboration group with respect to the project to a performance of a different collaboration group having a different plurality of users;

wherein deriving, based on the context, a report to inform one or more of the users on a performance of the collaboration group with respect to the project further comprises deriving the report based on the comparing; and providing access to the report to at least one user of the plurality of users.

15. The apparatus of claim 14, wherein the context is based on individual user activities.

16. The apparatus of claim 14, wherein the context is based on group activities.

17. The apparatus of claim 14, wherein the operations further comprise:

generating recommendations based on the comparing.

18. The apparatus of claim 14, wherein the operations further comprise generating an individual user performance recommendation for one of the users based on the context.

* * * * *